United States Patent
Mills et al.

(10) Patent No.: US 12,254,188 B1
(45) Date of Patent: Mar. 18, 2025

(54) SYSTEMS AND METHODS FOR MEMORY SNAPSHOTTING

(71) Applicant: SMART Modular Technologies, Inc., Newark, CA (US)

(72) Inventors: Andrew Mills, Coto de Caza, CA (US); Torry Steed, Poway, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 0 days.

(21) Appl. No.: 18/239,376

(22) Filed: Aug. 29, 2023

(51) Int. Cl.
*G06F 3/06* (2006.01)

(52) U.S. Cl.
CPC ............ *G06F 3/0619* (2013.01); *G06F 3/065* (2013.01); *G06F 3/0673* (2013.01)

(58) Field of Classification Search
CPC ......................................... G06F 11/1446–1469
See application file for complete search history.

(56) References Cited

U.S. PATENT DOCUMENTS

| | | | | |
|---|---|---|---|---|
| 9,383,934 | B1* | 7/2016 | Lukacs | G06F 3/0622 |
| 9,696,940 | B1* | 7/2017 | Neumann | G06F 3/0604 |
| 11,226,755 | B1* | 1/2022 | Douglass | G06F 3/0659 |
| 2009/0327589 | A1* | 12/2009 | Moshayedi | G06F 3/0688 |
| | | | | 711/E12.001 |
| 2019/0361608 | A1* | 11/2019 | Kim | G06F 3/064 |

OTHER PUBLICATIONS

CXL specification 3.1 Aug. 7, 2023. (Year: 2023).*
Dell, Inc., "Dell EMC NVDIMM-N Persistent Memory User Guide," Revision A12, Aug. 2023, available from the Internet: [URL: https://www.dell.com/support/manuals/en-us/poweredge-r740xd/nvdimm-n_ug_pub/battery?guid=guid-99d8f612-c316-48ce-a35b-eed2ba32d5d7&lang=en-US], 54 pages.
Posey, Brian, "Answer: When does storage snapshot technology work best?," Feb. 24, 2016, available from the Internet: [URL: https://www.techtarget.com/searchdatabackup/answer/When-does-storage-snapshot-technology-work-best], TechTarget, 3 pages.
Posey, Brian, "Definition: storage snapshot," Tech Accelerator, Feb. 2021, available from the Internet: [URL: https://www.techtarget.com/searchdatabackup/definition/storage-snapshot#:~: text=A%20storage%20snapshot%20is%20a,they%20can%20roll%20back%20to.], TechTarget, 6 pages.

(Continued)

*Primary Examiner* — Khoa D Doan
(74) *Attorney, Agent, or Firm* — Withrow & Terranova, P.L.L.C.

(57) ABSTRACT

Systems and methods for memory snapshots are disclosed. In particular, a memory device may include a volatile section and a backup persistent storage section. A snapshot manager circuit is positioned between a host control circuit or central processors. This snapshot manager circuit acts as a memory virtualization layer within the memory device and may use a redirect on write type command to put a snapshot of actively changed memory to a reserved memory area in the volatile section. A background function may copy the snapshots to the persistent storage section. Because the snapshot manager circuit is in the hardware memory access layers of the memory device, operation of the application is not interrupted or paused to access the specific memory sections. Further, snapshots are more readily available in the memory used by the host control circuit.

18 Claims, 6 Drawing Sheets

(56) References Cited

OTHER PUBLICATIONS

Prasad, Somm, "Storage Snapshot Technology," Jul. 30, 2020, available from the Internet: [URL: https://www.geeksforgeeks.org/storage-snapshot-technology/], GeeksforGeeks, 8 pages.

Snia, "NVDIMM Technical Brief: Solving Data Volatility," Jan. 2014, available from the Internet: [URL: https://www.snia.org/sites/default/files/technical-work/whitepapers/SNIA-NVDIMM-Technical-Brief.pdf], 6 pages.

\* cited by examiner

SYSTEMS AND METHODS FOR MEMORY SNAPSHOTTING

BACKGROUND

I. Field of the Disclosure

The technology of the disclosure relates generally to memory devices and snapshot backup systems for such memory devices.

II. Background

Computing devices abound in modern society. The prevalence of these devices is driven in part by the many functions that are now enabled on such devices. Increased processing capabilities in such devices enable enhanced user experiences. With the advent of the myriad functions available to such devices, the size and complexity of the operating systems used to control the computing devices have increased. Likewise, there is a general trend for increasingly large and complex software applications. This increase in size and complexity requires more available memory to support the host processor. In general, most of the memory is volatile random-access memory (RAM). While volatile RAM is appropriate to meet speed, cost, and size requirements, its volatile nature makes long-term storage therein impractical. Accordingly, techniques have been developed to back up the volatile RAM to prevent complete data loss in the event of power failure or power interruption. As the size of the memory increases, there is room for innovation in how such backups are handled.

SUMMARY

Aspects disclosed in the detailed description include systems and methods for memory snapshotting. In an exemplary aspect, a memory device may include a volatile section and a backup persistent storage section. A snapshot manager circuit is positioned between a host control circuit or central processors and a control circuit for the memory device. This snapshot manager circuit acts as a memory virtualization layer within the memory device and may use a redirect on write type command to put a snapshot of actively changed memory to a reserved memory area in the volatile section. A background function may copy the snapshots to the persistent storage section. Because the snapshot manager circuit is in the hardware memory access layers of the memory device, operation of the application is not interrupted or paused to access the specific memory sections. Further, snapshots are more readily available in the memory used by the host control circuit. The presence of such snapshots in the memory allows the computing device to be rewound to a number of different temporal states more readily in the event of a crash, virus, or other event. Such rewinding may be particularly helpful when long-running processes such as three-dimensional rendering or a machine learning process are active by avoiding having to start over at the beginning of such long-running processes.

In this regard, in one aspect, a memory device is disclosed. The memory device includes a bus interface configured to be coupled to a memory bus and a volatile random-access memory (RAM) portion comprising an active portion and a reserved portion. The memory device further includes a snapshot manager circuit coupled to the bus interface and the volatile RAM portion and configured to take a snapshot of changed portions of the active portion and update a management table with information relating to the snapshot.

In another aspect, a method of providing snapshots for memory devices is disclosed. The method includes using a snapshot manager circuit with a nonvolatile memory device to take a snapshot of changed portions of an active portion of volatile RAM. The method further includes updating a management table with information relating to the snapshot.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, no intervening elements are present. Likewise, it will be understood that when an element such as a layer, region, or substrate is referred to as being "over" or extending "over" another element, it can be directly over or extend directly over the other element, or intervening elements may also be present. In contrast, when an element is referred to as being "directly over" or extending "directly over" another element, no intervening elements are present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, no intervening elements are present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In keeping with this admonition regarding definitions, as used herein, the term double data rate or DDR is an industry term that means transferring data on the rising and falling edge of the clock signal, allowing for faster data transfer rates as compared to single data rate (SDR), which is only clocked on one edge of the clock (either rising or falling edge). As noted, DDR and SDR are terms used pervasively within the memory and computer industries, and there are various standards such as DDR3, DD4, DDR5, etc. which relate to this concept.

Aspects disclosed in the detailed description include systems and methods for memory snapshotting. In an exemplary aspect, a memory device may include a volatile section and a backup persistent storage section. A snapshot manager circuit is positioned between a host control circuit or central processors and a control circuit for the memory device. This snapshot manager circuit acts as a memory virtualization layer within the memory device and may use a redirect on write type command to put a snapshot of actively changed memory to a reserved memory area in the volatile section. A background function may copy the snapshots to the persistent storage section. Because the snapshot manager circuit is in the hardware memory access layers of the memory device, operation of the application is not interrupted or paused to access the specific memory sections. Further, snapshots are more readily available in the memory used by the host control circuit. The presence of such snapshots in the memory allows the computing device to be rewound to a number of different temporal states more readily in the event of a crash, virus, or other event. Such rewinding may be particularly helpful when long-running processes such as three-dimensional rendering or a machine learning process are active by avoiding having to start over at the beginning of such long-running processes.

Figure 1:
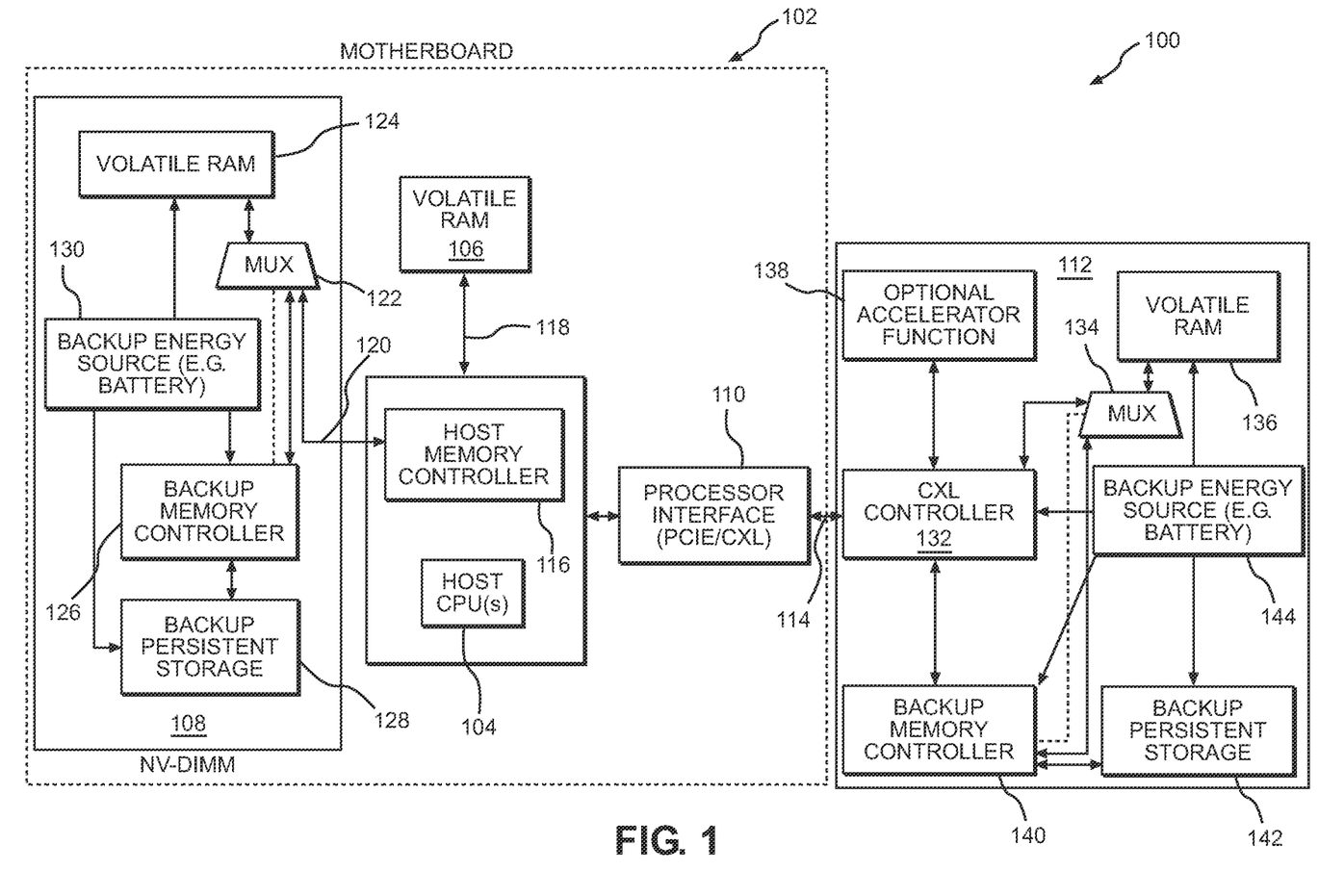
FIG. 1 is a block diagram of an exemplary computing device having a processor and volatile memory devices that have backup persistent memory elements.
Figure 2A:
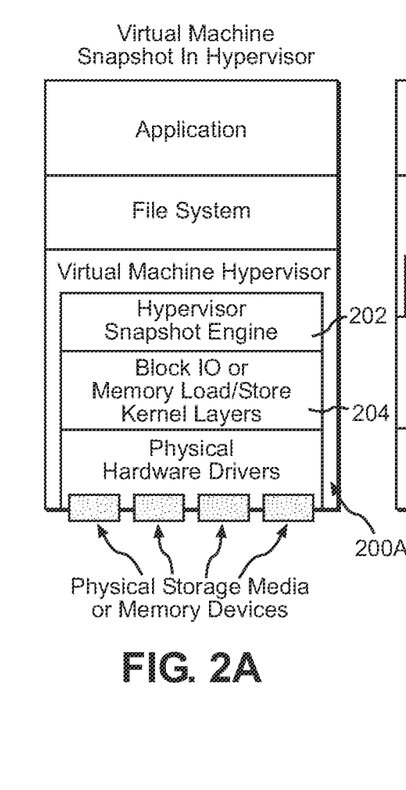
FIGS. 2A-2D are examples of existing snapshot schemes on various types of computing devices to assist in understanding how aspects of the present snapshot process operate.
Figure 2B:
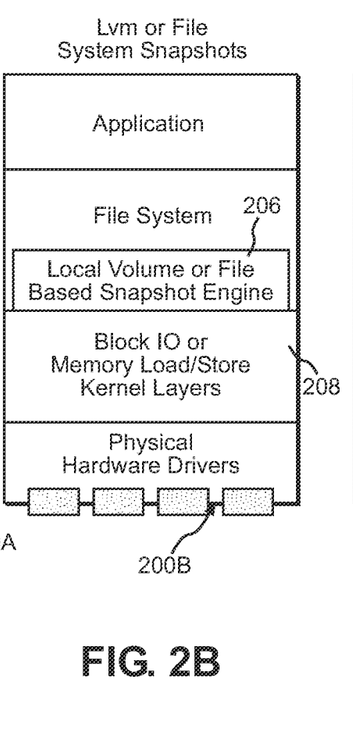
Figures 2C, 2D:
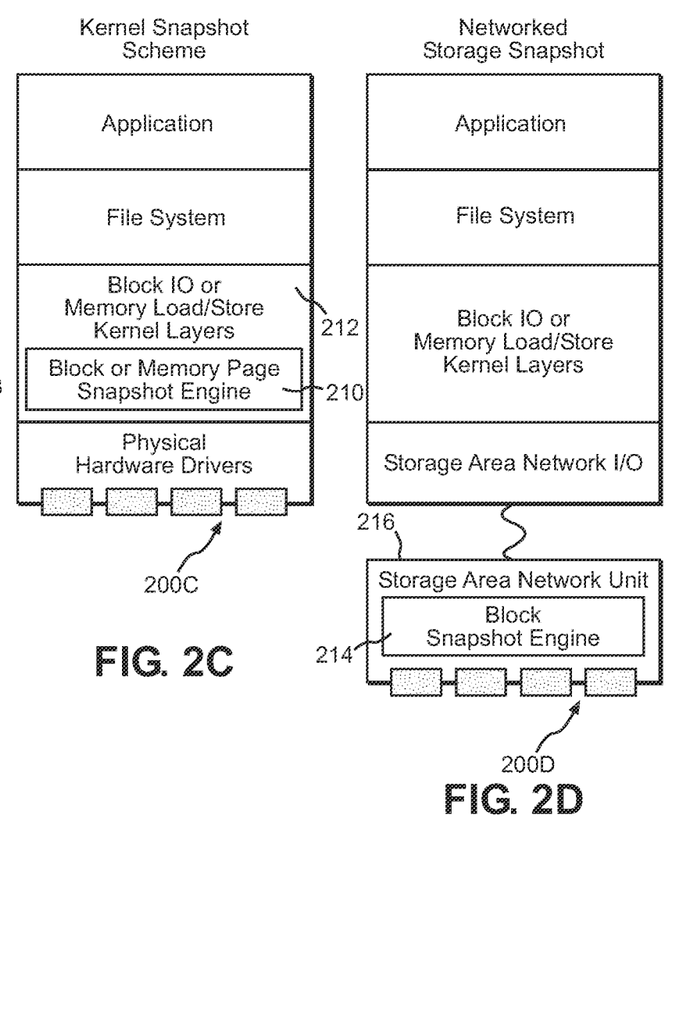
Figure 3:
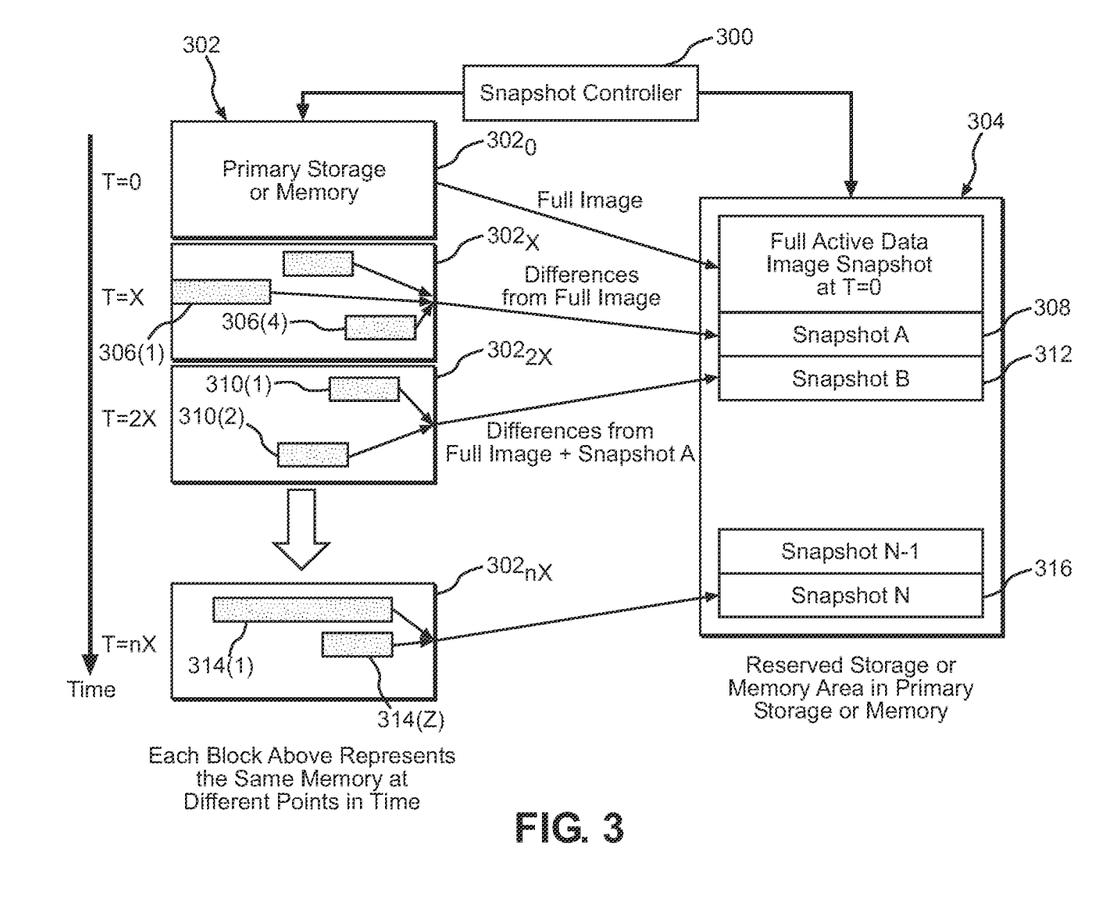
FIG. 3 is a signal flow diagram showing a conventional snapshot process.

Before addressing the particulars of the present disclosure, an overview of existing snapshot solutions relative to a conventional computing device is provided with reference to FIGS. 1-3. A discussion of exemplary aspects of the present disclosure begins below with reference to FIG. 4A.

In this regard, FIG. 1 is a block diagram of a computing device 100. The computing device 100 may include a motherboard 102. The motherboard 102 may have a host processor (also sometimes referred to as a computer processing unit (CPU)) 104, a first local memory 106, and a second local memory sub-system 108. The motherboard 102 may also have a communication interface 110 that allows communication to an external memory sub-system 112 through a bus 114. In an exemplary aspect, the bus 114 may be a peripheral component interconnect express (PCIe) bus, a compute express link (CXL) bus operating as an enhanced PCIe mode, or the like. Also in an exemplary aspect, the sub-system may be a dedicated memory module such as a memory dual in-line memory module (DIMM) or a CXL E3.S memory module.

The host processor 104 may include a host memory controller 116 that communicates with the first local memory 106 through a first internal memory bus 118. The host memory controller 116 may further communicate with the second local memory sub-system 108 through a second internal memory bus 120. The first local memory 106 may be formed from volatile random-access memory (RAM), for example, DDR4 or DDR5 memory.

The second local memory sub-system 108 may include a multiplexer (mux) 122 that provides access to a volatile RAM 124. The mux 122 also communicates with a backup memory controller 126. The backup memory controller 126 is coupled to a persistent memory 128. The persistent memory 128, backup memory controller 126, mux 122, and volatile RAM 124 may also be coupled to a backup energy source (e.g., battery) 130. At the command of the host memory controller 116 or on detection of power loss, the backup memory controller 126 may cause the information in the volatile RAM 124 to be copied into the persistent memory 128.

Similarly, the external memory sub-system 112 may have a bus interface (not shown) that sends and receives signals over the bus 114. Received signals are passed to a control circuit 132 (or the interface may be integrated into the control circuit 132) and pass through a mux 134 to a volatile RAM 136. Optionally, an accelerator circuit 138 may be present to provide local processing capability on data stored in the volatile RAM 136. The external memory sub-system 112 may further have a backup memory controller 140. The backup memory controller 140, persistent storage 142, mux 134, and volatile RAM 136 may be coupled to a persistent memory 142 and a backup energy source (e.g., battery) 144. At the command of the host memory controller 116 or on detection of power loss, the backup memory controller 140 may cause information in the volatile RAM 136 to be copied into the persistent memory 142.

In conventional computing devices 100, there is usually a tight connection between the host processor 104 and the memory elements. Accordingly, any form of snapshot manager usually lies in a logical volume, is file-based, block or memory kernel software-based (i.e., as part of an operating system), and/or implemented in a storage area network storage unit as part of embedded firmware. Examples are provided in FIGS. 2A-2D, where FIG. 2A illustrates a computing device 200A that includes a snapshot engine 202 as a hypervisor in a kernel layer 204. Similarly, FIG. 2B illustrates a computing device 200B that has a snapshot engine 206 in a local volume 208. Similarly, FIG. 2C illustrates a computing device 200C that has a snapshot engine 210 in the kernel layers 212. FIG. 2D illustrates a computing device 200D that has a snapshot engine 214 in a storage area network unit 216.

In practice, a snapshot controller such as snapshot engines 202, 206, 210, or 214 causes a full image copy of the memory to be copied and then takes partial image copies of any changes to the original memory at subsequent times. This process is illustrated in FIG. 3. Specifically, a snapshot controller 300 causes an entirety of memory 302 at time T=0 (i.e., $302_0$) to be copied into a reserved storage memory 304. Portions 306(1)-306(Y) of memory 302 have changed by time T=X (i.e., $302_X$), such as by write commands or the like. These differences, and thus, only portions 306(1)-306 (Y), are copied into the reserved storage memory 304 as snapshot 308. Similarly, portions 310(1), 310(2) have changed by time T=2X (i.e., $302_{2X}$), and these differences, but only these differences (and not portions 306(1)-306(Y)), are copied into the reserved storage memory 304 as snapshot 312. This process repeats periodically or on other trigger events through time T=nX (i.e., $302_{nX}$). By time nX, portions 314(1)-314(Z) have changed, and these changes are copied as snapshot 316. The reserved memory 304 may be in a persistent (e.g., 128 or 142 of FIG. 1) or non-persistent (e.g., 124 or 136 of FIG. 1) portion of the memory or some other location as is well understood.

The use of software to drive the snapshot function in any of the computing devices 200A-200D will negatively impact performance as access to the memory 302 is paused or suspended while the snapshot is being created and copied from the memory 302 to the reserved storage memory 304. While small interruptions may be undetected by a user in the course of light activity, as the size of memory increases to handle increasingly complex software (e.g., machine learning programs or the like), these pauses may become more discernable to the user and are thus undesirable. Furthermore, loss of power is difficult to manage in each of the computing devices 200A-200D requiring large system wide energy backup schemes that have sufficient power to keep the entire system running while critical snapshot data is backed up to persistent memory.

Exemplary aspects of the present disclosure contemplate placing a snapshot manager circuit between a host processor and the memory that will use a redirect-on-write approach to generating snapshots. Such a memory may also have persistent backup memory and self-contained backup energy source to save data in a power loss scenario for example. The placement and approach generate little or no delays while snapshots are created and also allows for background saving to persistent memory. The ease of snapshots allows plural snapshots to be created and saved so that when a reset or rewind is needed, a suitable restart point may be selected readily.

Figure 4A:
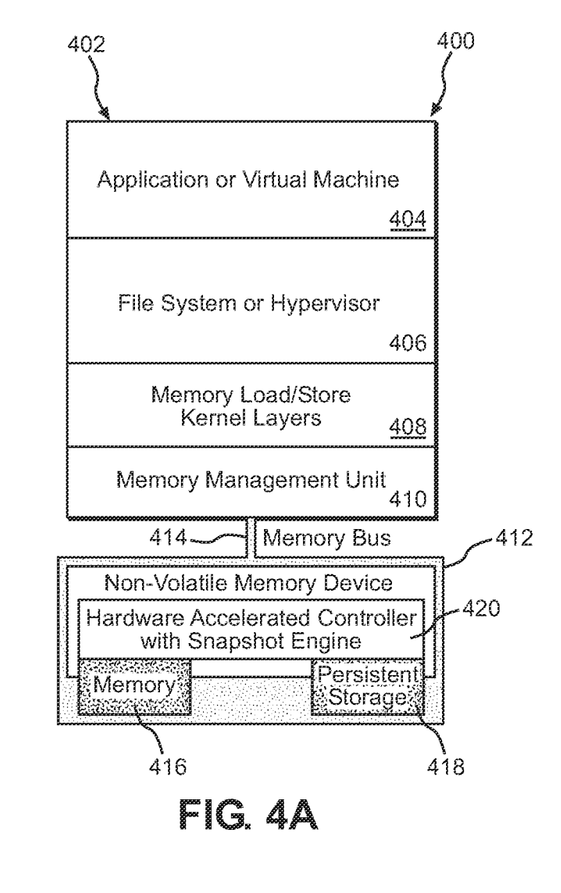
FIG. 4A is a block diagram of a computing device with a snapshot manager circuit of the present disclosure illustrated.
Figure 4B:
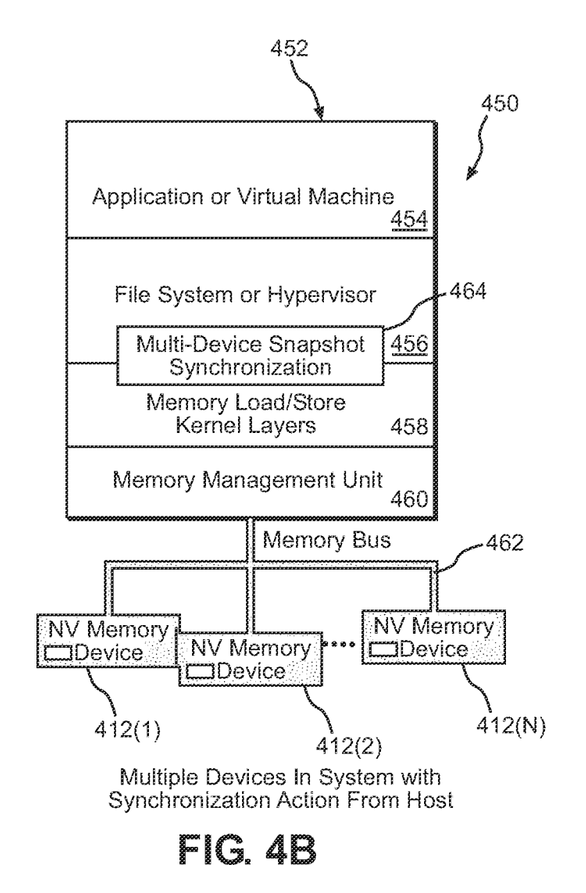
FIG. 4B is a block diagram of a computing device with multiple memory devices and a multi-device snapshot manager circuit of the present disclosure illustrated.

In this regard, FIGS. 4A and 4B illustrate exemplary placement of the snapshot manager for a computing device having a single memory device or a computing device having plural memory devices respectively. Thus, FIG. 4A illustrates a computing device 400 having a primary host processor 402 with an application layer 404 (also referred to as a virtual machine), a file system layer 406 (also referred to as a hypervisor), a memory load/store kernel layer 408, and a memory management unit 410. The memory management unit 410 is coupled to a nonvolatile memory device 412 through a memory bus 414. Within the nonvolatile memory device 412, there may be a volatile memory 416 and a persistent storage 418. A snapshot manager circuit 420 may manage taking snapshots of the volatile memory 416.

Similarly, FIG. 4B illustrates a computing device 450 having a primary host processor 452 with an application layer 454, a file system layer 456, a memory load/store kernel layer 458, and a memory management unit 460. The memory management unit 460 is coupled to a plurality of nonvolatile memory devices 412(1)-412(N) through a memory bus 462. While not shown in FIG. 4B, each nonvolatile memory device 412(1)-412(N) has respective volatile memories, persistent storages, and internal snapshot manager circuits. A multi-device snapshot synchronization circuit 464 may reside between the file system layer 456 and the memory load/store kernel layer 458.

Figure 5:
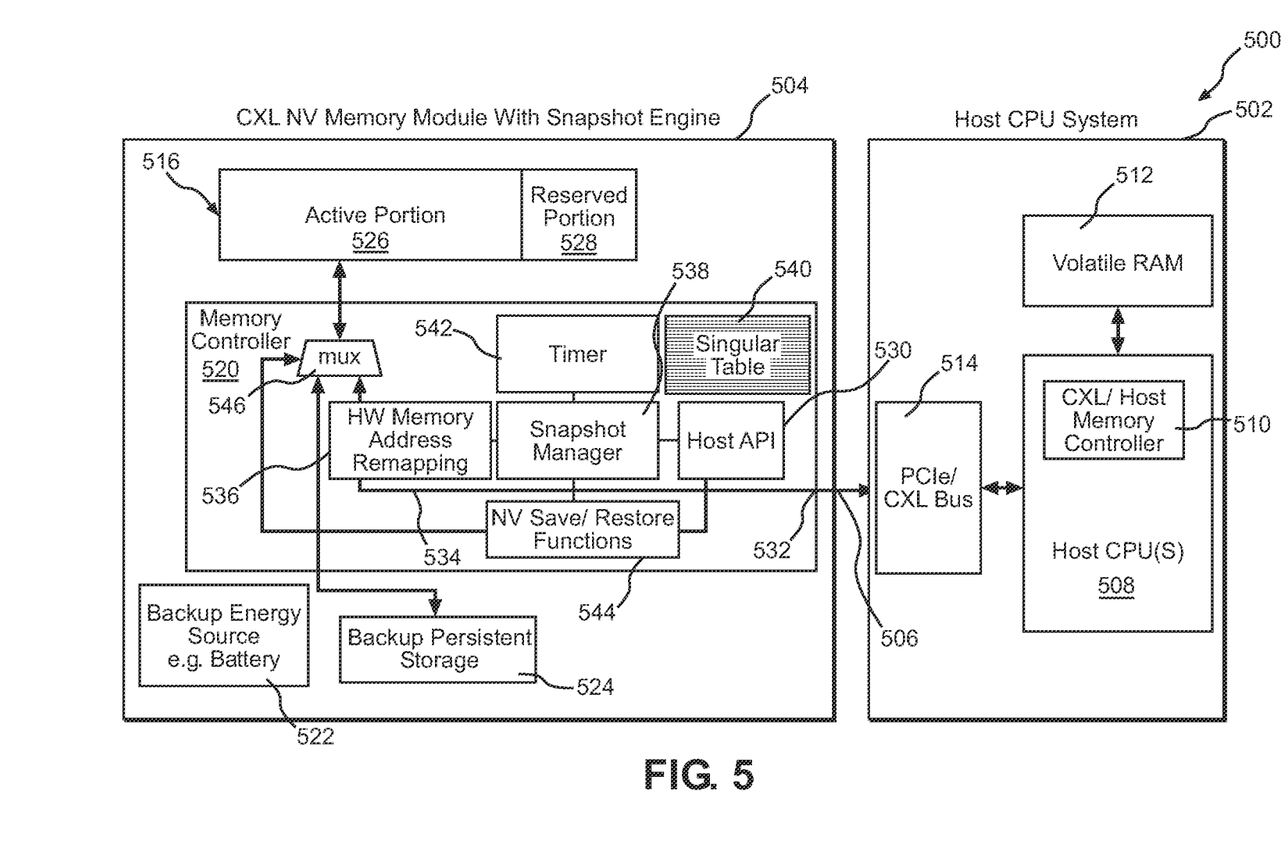
FIG. 5 is a block diagram providing additional details of a snapshot manager circuit in a memory module according to the present disclosure.

More detail for a memory device can be seen in FIG. 5. In this regard, FIG. 5 illustrates a system 500 having a host computing system 502 and a nonvolatile memory device 504 coupled by a memory bus 506. The host computing system 502 may include a host processor 508 with a host memory controller 510, local volatile memory 512, and a bus interface 514. The bus interface 514 may be a PCIe bus interface, a CXL bus interface, a CXL over PCIe bus interface, or the like.

The nonvolatile memory device 504 may include a volatile RAM portion 516, a local memory controller 520, a backup energy source 522 (e.g., a battery), and a persistent memory portion 524. The volatile RAM portion 516 may include an active portion 526 and a reserved portion 528. The reserved portion 528 may be where snapshots are stored until backed up and put into persistent memory portion 524.

The local memory controller 520 may have a host application programming interface (API) 530 that couples to a bus interface 532 such as through an internal bus 534. The internal bus 534 may also couple to a hardware memory address remapping circuit 536. The host API 530 may communicate with a snapshot manager circuit 538 that has a snapshot management table 540. The snapshot manager circuit 538 may further communicate or be controlled in part by a timer 542, which dictates when a snapshot is taken. The snapshot manager circuit 538 may further communicate with a nonvolatile save/restore function circuit 544. A mux 546 communicates with the hardware memory address remapping circuit 536, the nonvolatile save/restore function circuit 544, the persistent memory portion 524, and the volatile RAM portion 518. Data being written from the host computing system 502 arrives on the internal bus 534 and is remapped by the hardware memory address remapping circuit 536 for storage in the active portion 526. The host API 530 also enables the host CPU 508 to issue commands to cause amongst other things, a host-initiated snapshot, setup reserved memory area percentage amounts, setup the number of snapshots, or read status information from the snapshot manager 538.

Note that insertion of the snapshot manager circuit 538 is facilitated in part by the separation of the active portion 526 from the host memory controller 510 by the bus 506. However, it should be appreciated that such an insertion may take place even in the local volatile memory 512.

In an exemplary aspect, the size of the reserved portion 528 may be set based on a percentage of the total size of the volatile memory 516. While 25% is currently contemplated, larger values up to 50% and lower values down to 5% are also contemplated. This size allocation may be based on expected usage, and, in a further aspect, may be user configurable.

Figure 6:
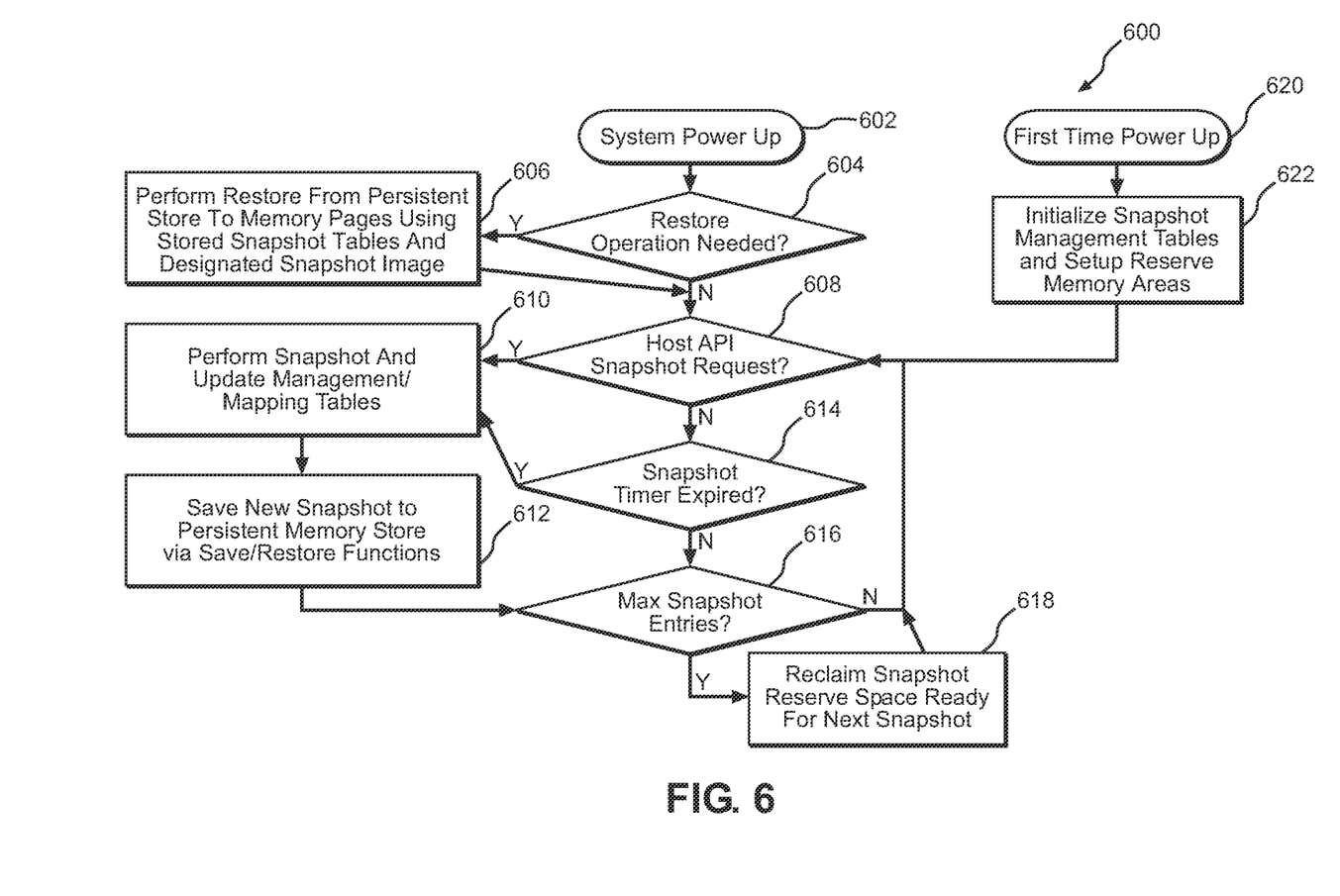
FIG. 6 is a flowchart illustrating an exemplary process for generating snapshots and backing up snapshots into a persistent memory element according to aspects of the present disclosure.

More detail about the snapshot process according to aspects of the present disclosure can be found in process 600, illustrated in FIG. 6. The process 600 begins during system power up (block 602). After power up, the host controller 508 determines if a restore operation is needed (block 604). If the answer to block 604 is yes, then the host controller 508 commands a restore and a restore is performed from persistent memory portion 524 to memory pages using stored snapshot tables and a designated snapshot image (block 606) (e.g., snapshots taken at time X or time Y). If the answer to block 604 is no, or after block 606, the snapshot manager circuit 538 determines if the host API 530 has a snapshot request (block 608). If the answer to block 608 is yes, then the snapshot manager circuit 538 performs a snapshot and updates the management/mapping tables (block 610). In the background, the memory controller 520 may save the new snapshot to persistent memory portion 524 via the nonvolatile save/restore function circuit 544 (block 612).

If the answer to block 608 is no, the snapshot manager circuit 538 determines if any other trigger events such as the timer 542 have expired (block 614). If the answer to block 614 is yes, the process 600 performs a snapshot (block 610). If, however, the answer to block 614 is no, or after block 612, the snapshot manager circuit 538 determines if a maximum number of snapshot entries have been made (block 616). This determination may also be influenced by the size of the reserved portion 528 and whether the saved snapshots are smaller than this size. If the answer to block 616 is no, then the process 600 may return to block 608. If, however, the answer to block 616 is yes, the snapshot manager circuit 538 reclaims snapshot reserve space in the reserved portion 528 by invalidating earlier snapshot areas to make the space ready for the next snapshot (block 618) and then returns to block 608.

It should be appreciated at a first-time power-up (block 620), instead of determining if a restore should be performed, the host memory controller 510 may issue a command to initialize the snapshot manager circuit 538 including any tables in tables 540 and set up the reserve RAM 528.

While not illustrated as part of the process 600, it should be appreciated that where there are multiple memory devices and a synchronization circuit as shown in FIG. 4B, the synchronization circuit may coordinate when snapshots are taken and/or when backups are made to minimize any performance degradation.

The systems and methods for memory snapshotting, according to aspects disclosed herein, may be provided in or integrated into any processor-based device. Examples, without limitation, include a server, a desktop computer, a laptop computer, or the like, as well as more specialized processor-based devices such as a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a server, a computer, a portable computer, a mobile computing device, a wearable computing device (e.g., a smartwatch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, or the like.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A memory device comprising:
a bus interface configured to be coupled to a memory bus;
a volatile random-access memory (RAM) portion comprising an active portion and a reserved portion;
a snapshot manager circuit coupled to the bus interface and the volatile RAM portion and configured to:
take a snapshot of changed portions of the active portion; and
update a management table with information relating to the snapshot; and
a hardware memory address remapping circuit coupled to the memory, snapshot manager, and bus interface.

2. The memory device of claim 1, further comprising a multiplexer and wherein the snapshot manager circuit is coupled to the volatile RAM portion through the multiplexer.

3. The memory device of claim 1, wherein the reserved portion comprises twenty-five percent (25%) of the volatile RAM portion.

4. The memory device of claim 1, wherein the snapshot manager circuit is further configured to store the snapshot in the reserved portion.

5. The memory device of claim 4, further comprising a backup circuit configured to backup snapshots taken by the snapshot manager circuit in a persistent memory.

6. The memory device of claim 1, further comprising a timer coupled to the snapshot manager circuit, wherein the snapshot manager circuit is configured to take the snapshot on expiration of the timer.

7. The memory device of claim 1, wherein the snapshot manager circuit is configured to take the snapshot responsive to a command from a host controller.

8. The memory device of claim 1, wherein the active portion is configured to be restored from the reserved portion.

9. The memory device of claim 1, wherein the memory device comprises a nonvolatile dual in-line memory module (NV-DIMM) stick.

10. The memory device of claim 1, wherein the bus interface comprises a compute express link (CXL) interface.

11. A method of providing snapshots for memory device, comprising:
- using a snapshot manager circuit with a nonvolatile memory device to take a snapshot of changed portions of an active portion of volatile random access memory (RAM);
- updating a management table with information relating to the snapshot; and
- storing the snapshot in a reserved portion of the volatile RAM.

12. The method of claim 11, further comprising checking for a restore request on system power up.

13. The method of claim 11, further comprising backing up the snapshot in persistent memory within the memory device.

14. The method of claim 13, further comprising restoring based on the snapshot in the persistent memory.

15. The method of claim 11, further comprising receiving a command from a host processor to take the snapshot.

16. The method of claim 11, wherein taking the snapshot comprises taking the snapshot responsive to expiration of a timer.

17. The method of claim 15, wherein receiving the command comprises receiving the command across a compute express link (CXL) bus.

18. A host processor comprising:
- a bus interface configured to be coupled to a plurality of non-volatile memory devices, each having an active portion and a reserved portion, through a memory bus;
- a multi-device snapshot synchronization circuit coupled to the bus interface and configured to instruct respective snapshot managers in each of the plurality of non-volatile memory devices to:
  - take a snapshot of changed portions of a respective active portion;
  - update a management table with information relating to the snapshot; and
  - restore based on one or more snapshots stored in persistent memory.

* * * * *